(12) United States Patent
Tsuruda et al.

(10) Patent No.: US 11,101,699 B2
(45) Date of Patent: Aug. 24, 2021

(54) POWER RECEPTION DEVICE, WEARABLE DEVICE, AND NON-CONTACT POWER FEEDING SYSTEM

(71) Applicants: Daihen Corporation, Osaka (JP); Hosei University, Tokyo (JP)

(72) Inventors: Yoshinori Tsuruda, Osaka (JP); Sousuke Nakamura, Tokyo (JP); Takahiro Miyaura, Tokyo (JP)

(73) Assignees: Daihen Corporation, Osaka (JP); Hosei University, Tokyo (JP)

( * ) Notice: Subject to any disclaimer, the term of this patent is extended or adjusted under 35 U.S.C. 154(b) by 0 days.

(21) Appl. No.: 16/978,547

(22) PCT Filed: Mar. 7, 2019

(86) PCT No.: PCT/JP2019/009057
§ 371 (c)(1),
(2) Date: Sep. 4, 2020

(87) PCT Pub. No.: WO2019/172366
PCT Pub. Date: Sep. 12, 2019

(65) Prior Publication Data
US 2021/0021157 A1 Jan. 21, 2021

(30) Foreign Application Priority Data

Mar. 8, 2018 (JP) .............................. JP2018-041691
Dec. 5, 2018 (JP) .............................. JP2018-228149

(51) Int. Cl.
*H02J 50/12* (2016.01)
*H02J 50/70* (2016.01)
(Continued)

(52) U.S. Cl.
CPC ................ *H02J 50/12* (2016.02); *H02J 7/02* (2013.01); *H02J 7/345* (2013.01); *H02J 50/70* (2016.02); *H02J 2207/50* (2020.01)

(58) Field of Classification Search
CPC .... H02J 7/02; H02J 50/12; H02J 50/70; H02J 50/80; H02J 7/345; H02J 2207/50
(Continued)

(56) References Cited

U.S. PATENT DOCUMENTS 8,093,758 B2   1/2012   Hussmann et al.
9,071,063 B2   6/2015   Endo et al.
(Continued)

FOREIGN PATENT DOCUMENTS

JP   H 11-168842 A    6/1996
JP   2004-072832 A    3/2004
(Continued)

OTHER PUBLICATIONS

English-language machine translation of the abstract, claims, and specification of JPH 11-168842 A (FP1), translated by J-PlatPat on Aug. 21, 2020.
(Continued)

*Primary Examiner* — John W Poos
(74) *Attorney, Agent, or Firm* — Sterne, Kessler, Goldstein & Fox P.L L.C

(57) ABSTRACT

Provide are a power reception device, a wearable device, and a non-contact power feeding system that can improve the transmission efficiency while suppressing upsizing of the circuit thereof. A power reception device (3) includes a variable capacitance circuit (100) and a power reception coil (41) constituting a resonance circuit together with the variable capacitance circuit (100), in which the variable capacitance circuit (100) includes a first capacitor (C1) and a second capacitor (C2) connected in parallel to each other, a
(Continued)

first switch (Tr1) connected in series to one end side of the first capacitor (C1), and a switch control circuit (110) that controls turning on and off of the first switch (Tr1) and includes a first comparator (OP1) that supplies a first control voltage to the first switch (Tr1) according to a comparison result between a reference voltage and an AC voltage applied to the second capacitor (C2).

16 Claims, 10 Drawing Sheets

(51) Int. Cl.
*H02J 7/02* (2016.01)
*H02J 7/34* (2006.01)
(58) Field of Classification Search
USPC .......................................................... 307/104
See application file for complete search history.

(56) References Cited

U.S. PATENT DOCUMENTS

| | | | |
|---|---|---|---|
| 2012/0223587 A1 | 9/2012 | Nishiyama et al. | |
| 2014/0106826 A1* | 4/2014 | Yeo .......................... | H02J 50/40 455/573 |
| 2015/0130271 A1* | 5/2015 | Suzuki .................. | B60L 53/122 307/9.1 |
| 2015/0326028 A1 | 11/2015 | Suzuki et al. | |

FOREIGN PATENT DOCUMENTS

| | | |
|---|---|---|
| JP | 2007-501600 A | 1/2007 |
| JP | 2012-055157 A | 3/2012 |
| JP | 2012-182980 A | 9/2012 |
| JP | 2013-070590 A | 4/2013 |
| JP | 2013-243882 A | 12/2013 |
| JP | 2014-143776 A | 8/2014 |
| JP | 2015-204708 A | 11/2015 |
| WO | WO 2013/042224 A | 3/2013 |

OTHER PUBLICATIONS

English-language machine translation of the abstract, claims, and specification of JP 2004-072832 A (FP2), translated by J-PlatPat on Aug. 31, 2020.

English-language machine translation of the abstract, claims, and specification of JP 2013-243882 A (FP7), translated by J-PlatPat on Aug. 21, 2020.

English-language machine translation of the abstract, claims, and specification of JP 2014-143776 A (FP8), translated by J-PlatPat on Aug. 21, 2020.

English-language machine translation of the abstract, claims, and specification of JP 2015-204708 A (FP9), translated by J-PlatPat on Aug. 21, 2020.

International Search Report and Written Opinion of the International Searching Authority directed to related International Patent Application No. PCT/JP2019/009057, dated May 14, 2019, with attached English-language translation; 11 pages.

* cited by examiner

POWER RECEPTION DEVICE, WEARABLE DEVICE, AND NON-CONTACT POWER FEEDING SYSTEM

TECHNICAL FIELD

The present invention relates to a power reception device, a wearable device, and a non-contact power feeding system.

BACKGROUND ART

In recent years, magnetic resonance technology attracts attention as one power feeding method for transmitting electric power from a power transmission device to a power reception device in a non-contact manner. In this magnetic resonance technology, the power transmission device and the power reception device have resonance circuits and electric power is transmitted via resonance phenomenon of these resonance circuits. Accordingly, electric power can be transmitted most efficiently when the resonance frequency of the resonance circuits of the power transmission device and the power reception device matches the frequency of a signal to be transmitted.

The resonance frequency of a resonance circuit is a specific value defined by the element values of the coil and the capacitor included in the resonance circuit. Accordingly, when, for example, one power reception device receives electric power from a plurality of power transmission devices, if the frequencies of signals transmitted from these power transmission devices are different, a deviation occurs between the frequency of the resonance circuit of the power reception device and the frequencies of the transmitted signals and the transmission efficiency is reduced. Alternatively, when, for example, a power reception device is installed in a flexible wearable device and the coil included in a resonance circuit is deformed, the inductance value fluctuates according to the deformation of the coil, consequently causing fluctuations of the resonance frequency of the resonance circuit. Accordingly, a deviation also occurs between the resonance frequency of the resonance circuit of the power reception device and the frequency of the transmitted signal in this case, possibly reducing the transmission efficiency.

A variable capacitor may be used as the capacitor included in the resonance circuit to eliminate such a deviation between frequencies. This enables the resonance frequency of the resonance circuit of the power reception device to be regulated depending on the frequencies of transmission signals from the power transmission devices in a form in which electric power is received from a plurality of power transmission devices. In addition, in a form in which a power reception device is installed a wearable device, by regulating the capacitance value of the capacitor so as to compensate the inductance value of a coil, the resonance frequency can be matched with the frequency of a transmitted signal. For example, Patent Document 1 below discloses the structure in which a variable capacitor is connected in parallel to a resonance capacitor as an example of a variable capacitor.

CITATION LIST

Patent Document

Patent Document 1: Patent Publication JP-A-H11-168842

SUMMARY

Technical Problem

The variable capacitor disclosed in Patent Document 1 has a plurality of capacitors arranged in parallel to each other and the combined capacitance value thereof is regulated by selectively switching the connection between the plurality of capacitors via a switch. However, in this method, the possible combined capacitance value becomes discrete and the capacitance value cannot be regulated continuously. Although a mechanical variable capacitor is known as a capacitor for which the capacitance value can be regulated continuously, use of a variable capacitor cannot avoid upsizing of the circuit.

Accordingly, an object of the present invention is to provide a power reception device, a wearable device, and a non-contact power feeding system that can improve the transmission efficiency while suppressing upsizing of the circuit.

Solution to Problem

A power reception device according to an aspect of the present invention includes a variable capacitance circuit; and a power reception coil that constitutes a resonance circuit together with the variable capacitance circuit, in which the variable capacitance circuit includes a first capacitor and a second capacitor connected in parallel to each other, a first switch connected in series to one end side of the first capacitor, and a switch control circuit that controls turning on and off of the first switch and includes a first comparator that supplies a first control voltage to the first switch according to a comparison result between a reference voltage and an AC voltage applied to the second capacitor.

According to this aspect, the first switch is periodically switched on and off according to a fluctuation of the AC voltage applied to the second capacitor. In addition, the time period for which the first switch is on is controlled according to the height of the reference voltage. This can continuously control the apparent combined capacitance value of the variable capacitance circuit and regulate the resonance frequency of the resonance circuit. Accordingly, as compared with the structure having, for example, a mechanical variable capacitor, the transmission efficiency of electric power can be improved while suppressing upsizing of the circuit.

In the aspect described above, the variable capacitance circuit may further include a second switch connected in series to the other end side of the first capacitor, and the switch control circuit may further include a second comparator that supplies a second control voltage to the second switch according to a comparison result between the reference voltage and an opposite phase voltage having a phase opposite to a phase of the AC voltage and control turning on and off of the second switch.

According to this aspect, the second switch is periodically switched on and off according to a fluctuation of the opposite phase voltage. In addition, the time period for which the second switch is on is controlled according to the height of the reference voltage. Accordingly, as compared with the structure having one switch, the combined capacitance value of the variable capacitance circuit can be controlled in a wide range and the resonance frequency of the resonance circuit can be regulated in a wide range.

In the aspect described above, the variable capacitance circuit may further include a second switch connected in series to the other end side of the first capacitor, and the switch control circuit may further include a second comparator that supplies a second control voltage to the second switch according to a comparison result between a reversed reference voltage obtained by reversing a sign of the reference voltage and the AC voltage and controls turning on and off of the second switch.

According to this aspect, the second switch is periodically switched on and off according to a fluctuation of the AC voltage. In addition, the time period for which the second switch is on is controlled according to the height of the reversed reference voltage. Accordingly, as compared with the structure having one switch, the combined capacitance value of the variable capacitance circuit can be controlled in a wide range and the resonance frequency of the resonance circuit can be regulated in a wide range.

In the aspect described above, the variable capacitance circuit may further include a third switch connected in series to the first switch on the one end side of the first capacitor and a fourth switch connected in series to the second switch on the other end side of the first capacitor, the first comparator may supply the first control voltage to the fourth switch, the second comparator may supply the second control voltage to the third switch, and the third switch may be connected to the first switch and the fourth switch may be connected to the second switch so that parasitic diodes thereof are oriented oppositely to each other.

According to this aspect, only when all of the four switches are on, the paths on both sides of the first capacitor are conducted. Accordingly, unintended leakage of electrical charge from the first capacitor can be prevented.

In the aspect described above, the switch control circuit may further include an AND circuit that receives the first control voltage and the second control voltage and outputs a third control voltage, and the AND circuit may supply the third control voltage to the first switch and the second switch in place of the first control voltage and the second control voltage.

According to this aspect, since the first switch and the second switch connected to both sides of the first capacitor operate synchronously, unintended leakage of electrical charge from the first capacitor can be prevented.

In the aspect described above, the power reception device may further include a voltage and current detector that detects a voltage applied to the resonance circuit and a current flowing through the resonance circuit; and a reference voltage generation circuit that generates the reference voltage so as to reduce a phase difference between the voltage and the current detected by the voltage and current detector.

According to this aspect, the reference voltage is generated so as to enhance the resonance degree and this regulates the resonance frequency of the resonance circuit. Accordingly, the transmission efficiency of electric power can be improved.

In the aspect described above, the power reception device may further include a detector that detects electric power received by the power reception device and a reference voltage generation circuit that generates the reference voltage so that the electric power detected by the detector is equal to or more than a predetermined level.

According to this aspect, the reference voltage is generated based on the electric power received by the power reception device and this regulates the resonance frequency of the resonance circuit of the power reception device. Accordingly, the transmission efficiency of electric power can be improved.

In the aspect described above, the reference voltage generation circuit may further include a reference voltage regulator circuit that regulates the reference voltage according to a fluctuation of an amplitude value of the AC voltage.

According to this aspect, even if the amplitude value of the AC voltage fluctuates, since the reference voltage is regulated in response to the fluctuation, the duty ratio determined by the ratio between the amplitude value of the AC voltage and the reference voltage can be kept constant.

In the aspect described above, the reference voltage regulator circuit may include a rectifying circuit that rectifies the AC voltage, a voltage dividing circuit that divides the rectified voltage, and a differential amplification circuit that differentially amplifies the divided voltage.

According to this aspect, the reference voltage proportional to the amplitude value of the AC voltage can be generated.

A wearable device according to an aspect of the present invention includes the power reception device.

According to this aspect, even if the power reception coil is deformed and the inductance value of the power reception coil fluctuates, the resonance frequency can be regulated by controlling the capacitance value of the variable capacitance circuit so as to compensate the fluctuation. Accordingly, the transmission efficiency of electric power can be improved.

A non-contact power feeding system according to an aspect of the present invention includes the power reception device; a power transmission device that includes a power supply circuit and a power transmission unit and transmits electric power to the power reception device; a first detector that detects first electric power to be supplied from the power supply circuit to the power transmission unit; a second detector that detects second electric power received by the power reception device; and a reference voltage generation circuit that generates the reference voltage so as to increase the second electric power relative to the first electric power.

According to this aspect, the reference voltage is determined based on the electric power supplied by the power transmission device and the electric power received by the power reception device and this regulates the resonance frequency of the resonance circuit of the power reception device. Accordingly, the transmission efficiency of electric power can be improved.

Advantageous Effects of Invention

According to the present invention, it is possible to provide a power reception device, a wearable device, and a non-contact power feeding system that can improve the transmission efficiency while suppressing upsizing of the circuit.

DESCRIPTION OF EMBODIMENTS

Embodiments

Figure 1:
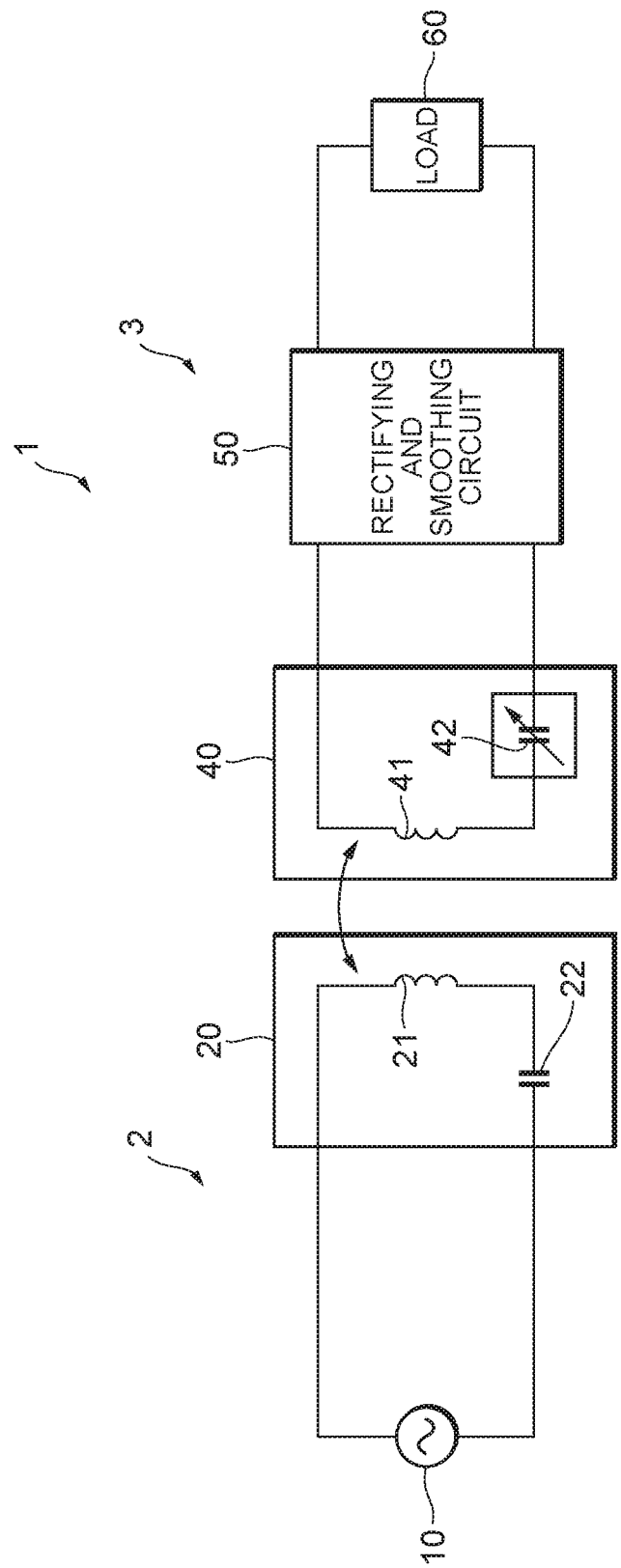
FIG. 1 is a diagram illustrating the entire structure of a non-contact power feeding system according to a first embodiment of the present invention.

Embodiments of the present invention will be described with reference to the attached drawings. It should be noted here that components with identical reference numerals have identical or similar structures in the drawings.

FIG. 1 is a diagram illustrating the entire structure of a non-contact power feeding system according to a first embodiment of the present invention. A non-contact power feeding system 1 illustrated in this drawing includes a power transmission device 2 that transmits electric power and a power reception device 3 that receives the electric power in a non-contact manner.

The power transmission device 2 includes, for example, a power supply circuit 10 and a power transmission unit 20.

A power supply circuit 10 generates and outputs an AC power supply voltage of a predetermined frequency (for example, approximately several kilohertz to several hundred megahertz). The AC power supply voltage is supplied to a power transmission unit 20.

The power transmission unit 20 includes a power transmission coil 21 and a resonance capacitor 22. The power transmission coil 21 and the resonance capacitor 22 connected in series to each other to form an LC series resonance circuit.

The power reception device 3 includes, for example, a power reception unit 40, a rectifying and smoothing circuit 50, and a load 60.

The power reception unit 40 includes a power reception coil 41 and a resonance capacitor 42. The power reception coil 41 and the resonance capacitor 42 are connected in series to each other to form an LC series resonance circuit. Here, a resonance frequency f0 of the LC series resonance circuit is generally represented as $f0=1/2\pi\sqrt{LC}$ (Hz) when the inductance value of the coil is L and the capacitance value of the capacitor is C. In the embodiment, the resonance capacitor 42 is configured by a variable capacitance circuit that can continuously regulate the capacitance value as described later. Accordingly, the resonance circuit (also referred to below as "the reception side resonance circuit") included in the power reception unit 40 can be regulated by controlling the capacitance value of the resonance capacitor 42. It should be noted here that details on the structure of the resonance capacitor 42 will be described later.

The rectifying and smoothing circuit 50 rectifies and smooths the electric power received by the power reception unit 40.

The load 60 consumes the electric power supplied from the power reception unit 40 via the rectifying and smoothing circuit 50. Although the load 60 is included in the power reception device 3 in FIG. 1, the load 60 does not need to be included in the power reception device 3. In addition, electric power may be stored in a charge target such as, for example, a battery or a capacitor instead of the load 60.

When electric power is output from the power transmission unit 20, magnetic field coupling is made between the power transmission coil 21 of the power transmission unit 20 and the power reception coil 41 of the power reception unit 40 and the power transmission unit 20 resonates with the power reception unit 40 at a specific resonance frequency. This supplies electric power from the power transmission device 2 to the power reception device 3 in via magnetic field resonance in the non-contact power feeding system 1.

Next, the specific structure of the variable capacitance circuit included in the resonance capacitor 42 will be described with reference to FIGS. 2 and 3.

Figure 2:
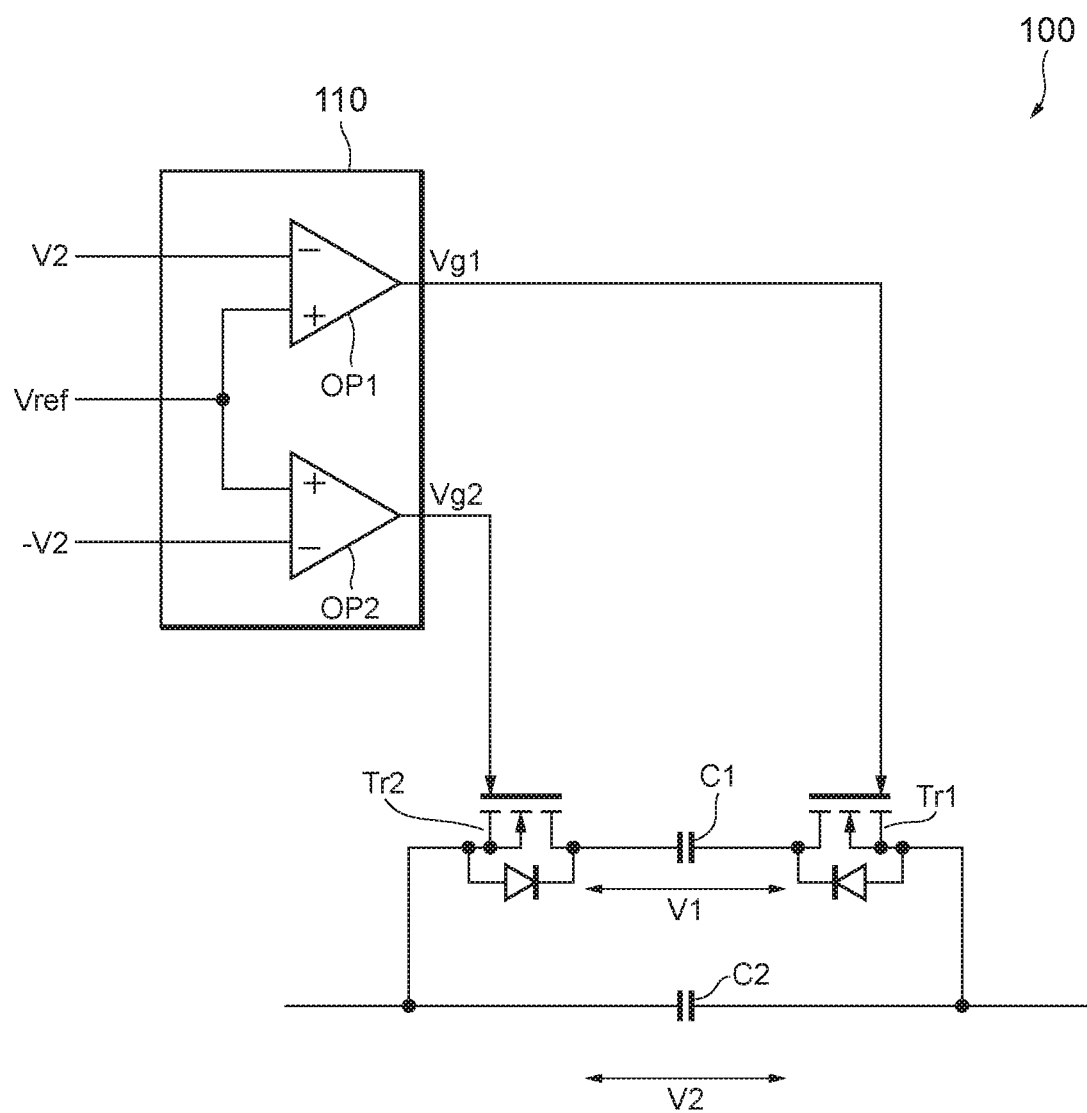
FIG. 2 is a diagram illustrating the circuit structure of a variable capacitance circuit included in a resonance capacitor illustrated in FIG. 1.

FIG. 2 is a diagram illustrating the circuit structure of the variable capacitance circuit included in the resonance capacitor 42. In addition, FIG. 3 is a graph illustrating fluctuations of various voltages of the variable capacitance circuit included in the resonance capacitor 42. It should be noted here that the vertical axes represent the volt (V) and the horizontal axes represent the time (s) in the graph illustrated in FIG. 3.

A variable capacitance circuit 100 illustrated in FIG. 2 includes capacitors C1 and C2, transistors Tr1 and Tr2, and a switch control circuit 110.

The capacitor C1 (first capacitor) and the capacitor C2 (second capacitor) are connected in parallel to each other. The capacitor C1 has a specific capacitance value, but the apparent capacitance value thereof is regulatable. The capacitor C2 has a specific capacitance value and the capacitance value thereof is fixed.

It is assumed that the voltage applied to both ends of the capacitor C1 is V1 and the voltage applied to both ends of the capacitor C2 is V2. A detector (not illustrated) detects the voltage V2 (AC voltage) applied to both ends of the capacitor C2 for supply to the switch control circuit 110 described later. In addition, a voltage −V2 (opposite phase voltage) having a phase opposite to that of the voltage V2 is generated for supply to the switch control circuit 110. That is, the voltage V2 and the voltage −V2 are AC voltages having the same frequency and phases opposite to each other (see FIGS. 3(a) and 3(b)).

The transistor Tr1 (first switch) is a switch connected in series to one end side of the capacitor C1. The transistor Tr2 (second switch) is a switch connected in series to the other end side of the capacitor C1. Although this specification assumes that the transistors Tr1 and Tr2 are MOSFETs (Metal oxide semiconductor Field-Effect Transistor), the transistors Tr1 and Tr2 are not limited to MOSFETs and may be another type of field-effect transistors, bipolar transistors, or the like, and may be any type of devices having a switching function. This is also true of transistors Tr3 and Tr4, which will be described later.

Specifically, in the transistor Tr1, the drain is connected to one end of the capacitor C1, the source is connected to one end of the capacitor C2, and a control voltage Vg1 (first control voltage) is supplied to the gate. In the transistor Tr2, the drain is connected to the other end of the capacitor C1, the source is connected to the other end of the capacitor C2, and a control voltage Vg2 (second control voltage) is supplied to the gate. Turning on and off of the transistors Tr1 and Tr2 is controlled according to the levels of the control voltages Vg1 and Vg2.

The switch control circuit 110 controls the time periods for which the transistors Tr1 and Tr2 are on or off according to the height of a reference voltage Vref. Specifically, the switch control circuit 110 includes comparators OP1 and OP2.

The comparators OP1 and OP2 include, for example, operational amplifiers. In the comparator OP1 (first comparator), the voltage V2 is supplied to the reversed input terminal, the reference voltage Vref is supplied to the non-reversed input terminal, and the control voltage Vg1 is output from the output terminal according to the comparison result thereof. The control voltage Vg1 has a high level voltage (for example, the power supply voltage) that turns on the transistor Tr1 when the reference voltage Vref is higher than the voltage V2 or has a low level voltage (for example, 0 V) that turns off the transistor Tr1 when the reference voltage Vref is lower than the voltage V2, as illustrated in FIGS. 3(a) and 3(c). This periodically switches the transistor Tr1 on and off according to a fluctuation of the voltage V2.

In the comparator OP2 (second comparator), the voltage −V2 is supplied to the reversed input terminal, the reference voltage Vref is supplied to the non-reversed input terminal, and the control voltage Vg2 is output from the output terminal according to the comparison result thereof. The control voltage Vg2 has a high level voltage that turns on the transistor Tr2 when the reference voltage Vref is higher than the voltage −V2 or has a low level voltage that turns off the transistor Tr2 when the reference voltage Vref is lower than the voltage −V2, as illustrated in FIGS. 3(b) and 3(d). This periodically switches the transistor Tr2 on and off according to a fluctuation of the voltage −V2.

Since the transistors Tr1 and Tr2 are periodically switched on and off as described above, electrical conduction and no conduction of one end side and the other end side of the capacitor C1 are switched periodically. Accordingly, the voltage V1 applied to both ends of the capacitor C1 fluctuates as the voltage V2 when the transistors Tr1 and Tr2 are both on and the voltage V1 is constant when one of the transistors Tr1 and Tr2 is off (see FIG. 3(e)). Accordingly, as compared with the case in which both ends of the capacitor C1 are always electrically conducted, the apparent capacitance value of the capacitor C1 is reduced.

In addition, as illustrated in FIGS. 3(a) and 3(b), the time periods (that is, the duty ratio) for which the control voltages Vg1 and Vg2 are at the high level can be regulated by regulating the height of the reference voltage Vref. Specifically, as the reference voltage Vref is higher, the time periods for which the control voltages Vg1 and Vg2 are at the high level are longer. This makes the time period (see FIGS. 3(c) and 3(d)) for which both the transistors Tr1 and Tr2 are on longer and the apparent capacitance value of the capacitor C1 larger. In contrast, as the reference voltage Vref is lower, the time periods for which the control voltages Vg1 and Vg2 are at the high level are shorter. This makes the time period for which both the transistors Tr1 and Tr2 are on longer and the apparent capacitance value of the capacitor C1 smaller.

As described above, the apparent capacitance value of the capacitor C1 is the smallest when there is time at which both the transistors Tr1 and Tr2 are off (for example, OF) and is the largest when both the transistors Tr1 and Tr2 are on, and the apparent capacitance value at this time is equal to the capacitance value specific to the capacitor C1. Accordingly, when the capacitance values specific to the capacitors C1 and C2 are Cx and Cy, respectively, the apparent combined capacitance value Cz of the capacitors C1 and C2 takes a continuous value within the range Cy≤Cz≤Cx+Cy. That is, in the variable capacitance circuit 100, the capacitance value can be continuously regulated according to the height of the reference voltage Vref.

It should be noted here that switches do not need to be provided on both end sides of the capacitor C1 in the variable capacitance circuit 100 as long as a switch is provided on at least one end side. When a switch is provided on one end side, the waveform of the voltage applied to both ends of the capacitor C1 is identical to the voltage V1 on one positive or negative side and identical to V2 on the other side as compared with the waveform of the voltage V1 illustrated in FIG. 3(e). This structure can also be used to continuously regulate the apparent capacitance value of the capacitor C1. It should be noted here that the structure in which switches are provided on both end sides of the capacitor C1 can regulate the apparent capacitance value of the capacitor C1 within a wider range than the structure in which a switch is provided on one end side of the capacitor C1.

In addition, although the method (also referred to below as the method A) that compares the voltage V2 applied to both ends of the capacitor C2 and the voltage −V2 having a phase opposite to that of the voltage V2 with the reference voltage Vref, respectively, is used when the control voltages Vg1 and Vg2 are generated in the variable capacitance circuit 100, the method for generating the control voltages Vg1 and Vg2 is not limited to this method. For example, the method (also referred to below as the method B) that compares the reference voltage Vref and the reversed reference voltage −Vref obtained by reversing the sign of the reference voltage Vref with the voltage V2, respectively, as described below may be used instead.

Figure 4:
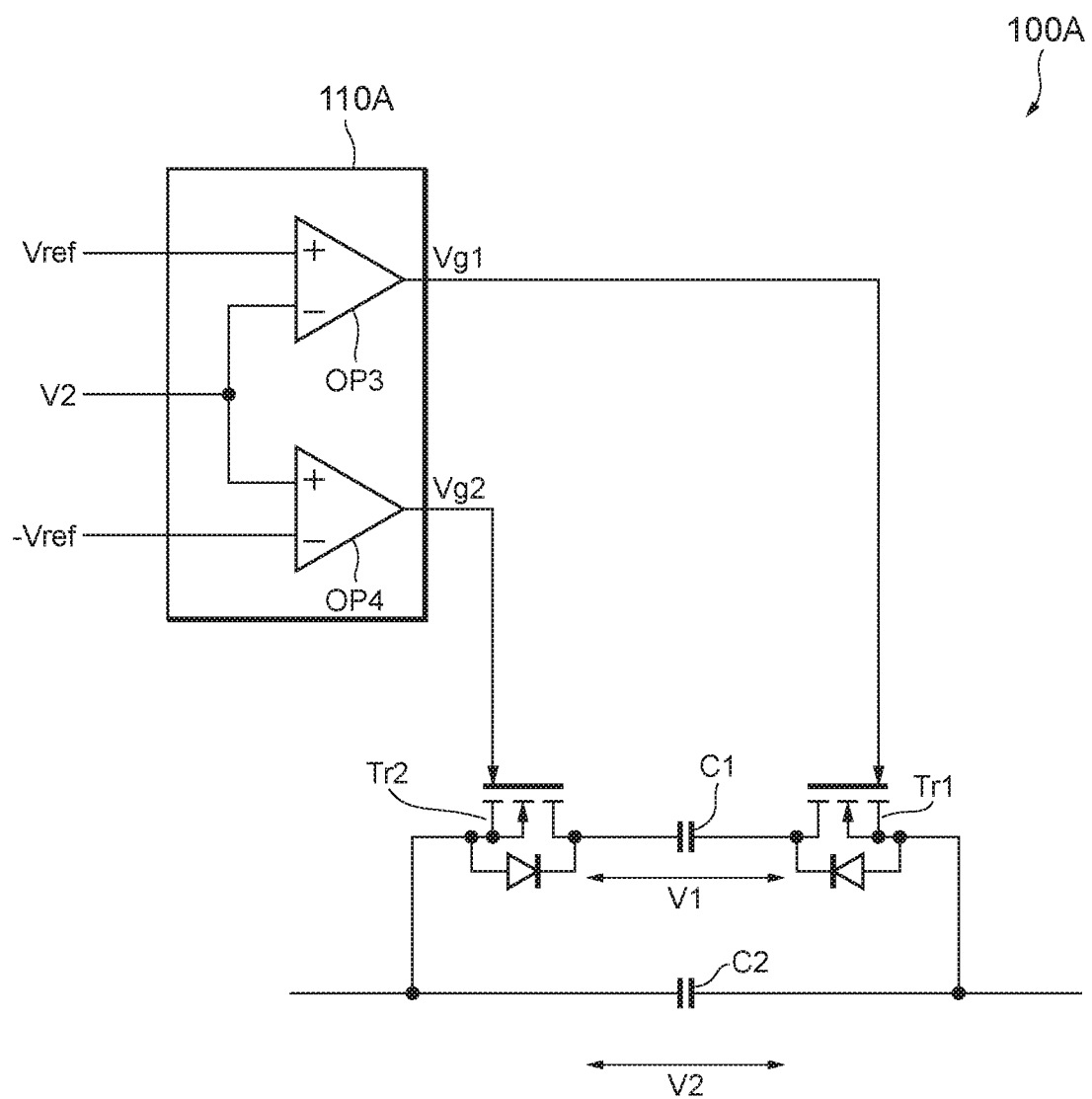
FIG. 4 is a diagram illustrating the circuit structure of a first modification of the variable capacitance circuit illustrated in FIG. 2.

FIG. 4 is a diagram illustrating the circuit structure of a first modification of the variable capacitance circuit illustrated in FIG. 2.

Specifically, a variable capacitance circuit 100A according to the first modification has a switch control circuit 110A in place of the switch control circuit 110 of the variable capacitance circuit 100 illustrated in FIG. 2. The switch control circuit 110A has comparators OP3 and OP4 in place of the comparators OP1 and OP2 of the switch control circuit 110.

The comparators OP3 and OP4 include, for example, operational amplifiers as in the comparators OP1 and OP2. In the comparator OP3 (first comparator), the voltage V2 is supplied to the reversed input terminal, the reference voltage Vref is supplied to the non-reversed input terminal, and the control voltage Vg1 is output from the output terminal according to the comparison result thereof. In the comparator OP4 (second comparator), the reversed reference voltage −Vref obtained by reversing the sign of the reference voltage Vref is supplied to the reversed input terminal, the voltage V2 is supplied to the non-reversed input terminal, and the control voltage Vg2 is output from the output terminal according to the comparison result thereof.

Figure 3:
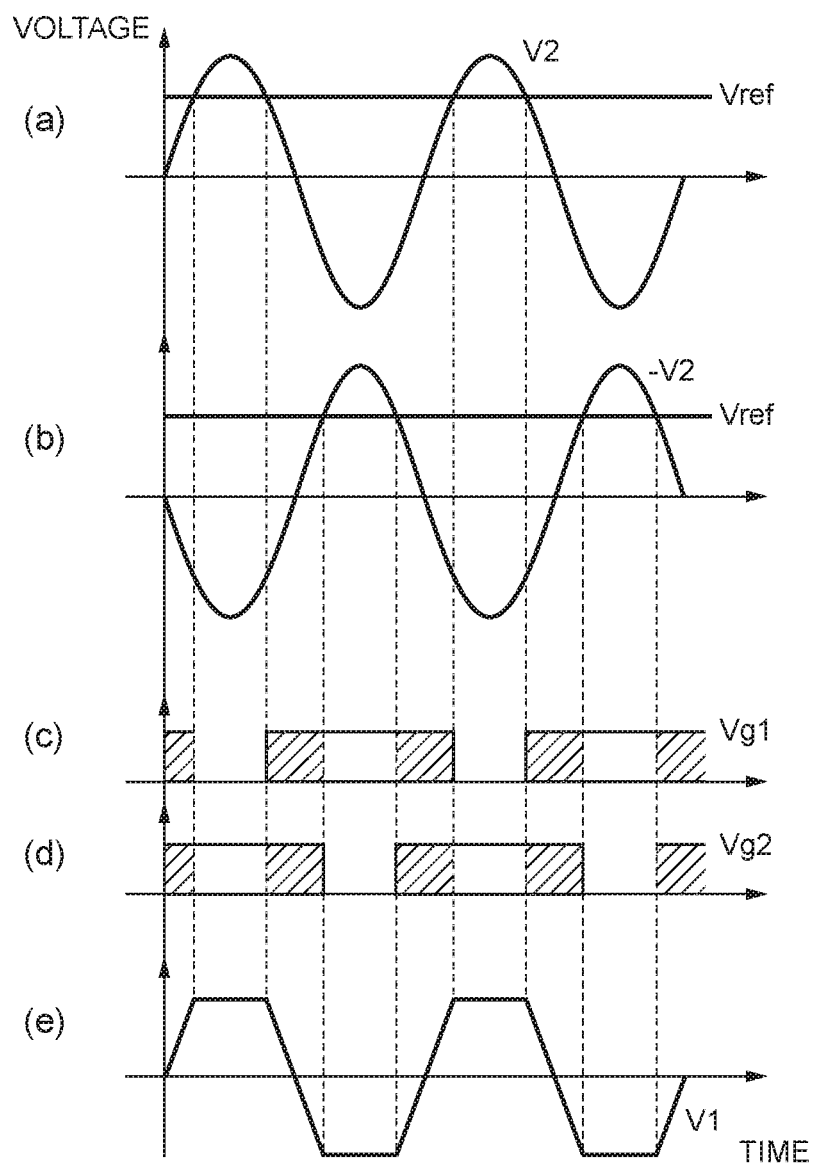
FIG. 3 is a graph illustrating fluctuations of various voltages of the variable capacitance circuit included in the resonance capacitor illustrated in FIG. 1.

This structure can also be used to generate to the control voltage having a waveform similar to that of the control voltages Vg1 and Vg2 illustrated in FIG. 3. Accordingly, the apparent capacitance value of the capacitor C1 can also be regulated in the variable capacitance circuit 100A as in the variable capacitance circuit 100.

Figure 5:
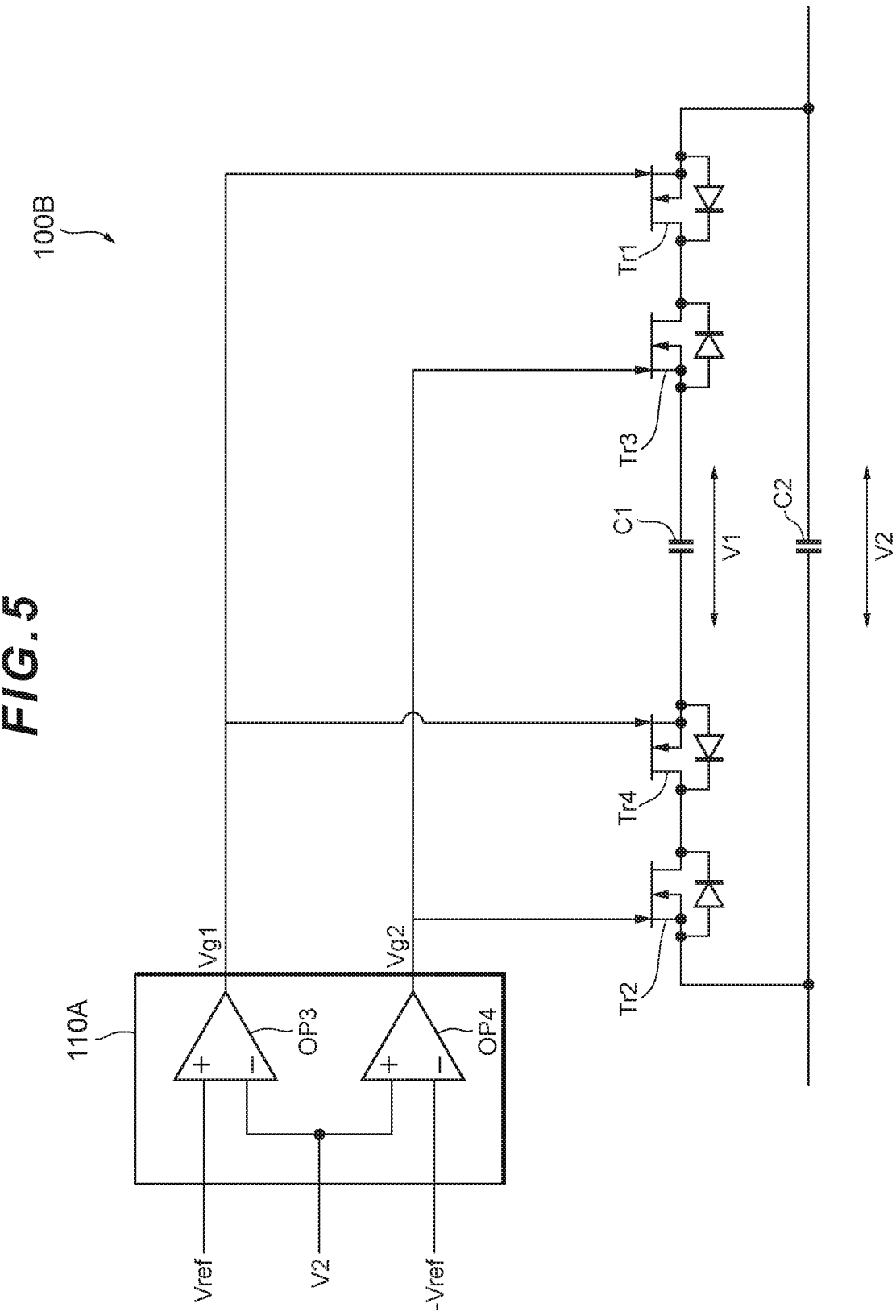
FIG. 5 is a diagram illustrating the circuit structure of a second modification of the variable capacitance circuit illustrated in FIG. 2.

FIG. 5 is a diagram illustrating the circuit structure of a second modification of the variable capacitance circuit illustrated in FIG. 2. As illustrated in FIG. 5, a variable capacitance circuit 100B according to the second modification further includes a transistor Tr3 and a transistor Tr4 as compared with the variable capacitance circuit 100A.

The transistor Tr3 (third switch) is a switch connected in series to the transistor Tr1 on one end side of the capacitor C1. The transistor Tr4 (fourth switch) is a switch connected in series to the transistor Tr2 on the other end side of the capacitor C1.

The transistor Tr1 and the transistor Tr3 are connected to each other, and the transistor Tr2 and the transistor Tr4 are connected to each other so that the parasitic diodes between the drains and the sources of the transistors are oriented reversely. Specifically, in the transistor Tr3, the drain is connected to the drain of the transistor Tr1, the source is connected to one end of the capacitor C1, and the control voltage Vg2 is supplied to the gate. In the transistor Tr4, the drain is connected to the drain of the transistor Tr2, the source is connected to the other end of the capacitor C1, the control voltage Vg1 is supplied to the gate. Turning on and off of the transistors Tr3 and Tr4 is controlled according to the levels of the control voltages Vg2 and Vg1.

In the variable capacitance circuit 100B according to this modification, the transistor Tr1 and the transistor Tr4 operate synchronously with each other and the transistor Tr2 and the transistor Tr3 operate synchronously with each other. Accordingly, for example, when the transistor Tr1 and the transistor Tr4 are on and the transistor Tr2 and the transistor Tr3 are off and when the transistor Tr1 and the transistor Tr4 off and the transistor Tr2 and the transistor Tr3 on, the paths on both sides of the capacitor C1 are not conducted. Only when all of the four transistors Tr1 to Tr4 are on, the paths on both sides of the capacitor C1 are conducted.

Accordingly, in the variable capacitance circuit 100B, the paths on both sides of the capacitor C1 are both conducted or both not conducted. That is, since the state in which one path is conducted and the other path is not conducted is not present, unintended leakage of the electrical charge stored in the capacitor C1 to the conducted path is prevented.

Figure 6:
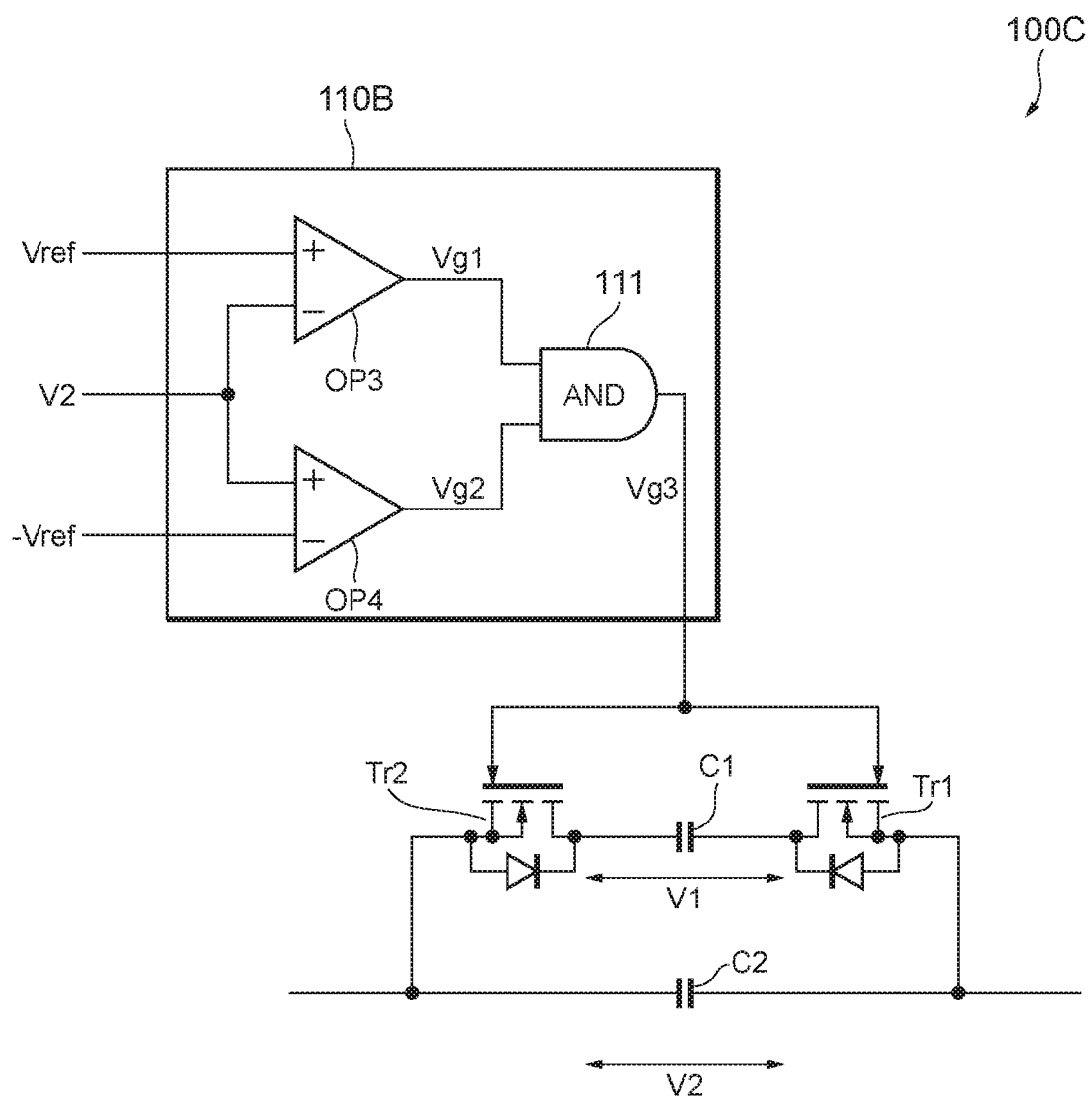
FIG. 6 is a diagram illustrating the circuit structure of a third modification of the variable capacitance circuit illustrated in FIG. 2.

FIG. 6 is a diagram illustrating the circuit structure of a third modification of the variable capacitance circuit illustrated in FIG. 2. As illustrated in FIG. 6, a variable capacitance circuit 100C according to the third modification has a switch control circuit 110B in place of the switch control circuit 110A of the variable capacitance circuit 100A illustrated in FIG. 4. The switch control circuit 110B further includes an AND circuit 111 as compared with the switch control circuit 110A.

The AND circuit 111 receives the control voltage Vg1 and the control voltage Vg2, outputs a control voltage Vg3 (third control voltage), and supplies the control voltage Vg3 to the gates of the transistors Tr1 and Tr2. The control voltage Vg3 has a high level when both the control voltage Vg1 and the control voltage Vg2 are at a high level or has a low level when at least one of the control voltage Vg1 and the control voltage Vg2 is at a low level. Accordingly, the transistor Tr1 and the transistor Tr2 operate synchronously with each other in this modification.

Since this structure also causes the paths on both sides of the capacitor C1 to be both conducted or both not conducted, unintended leakage of electrical charge from the capacitor C1 can be prevented.

In the embodiment, the variable capacitance circuits 100 and 100A to 100C are applied to the resonance capacitor 42 of the reception side resonance circuit. Then, the capacitance value of the resonance capacitor 42 is controlled so that the frequency of a signal received by the power reception device 3 is equal to the resonance frequency of the reception side resonance circuit. This enhances the resonance degree of the reception side resonance circuit and improves the transmission efficiency of electric power. Next, various control methods (that is, various control methods of the reference voltage Vref) of the capacitance value of the resonance capacitor 42 will be described.

Figure 7:
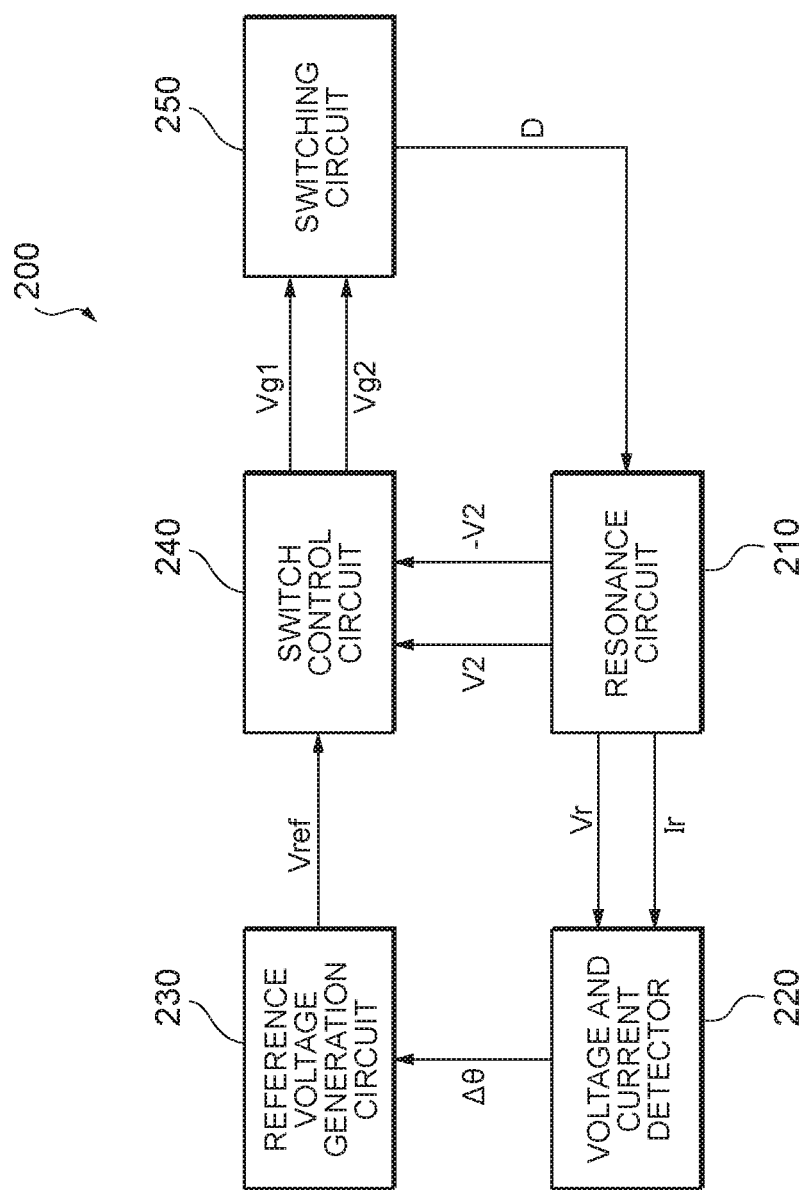
FIG. 7 is a block diagram illustrating a control system that controls the capacitance value of the resonance capacitor illustrated in FIG. 1.

FIG. 7 is a block diagram illustrating a control system that controls the capacitance value of the resonance capacitor 42. A control system 200 illustrated in FIG. 7 has the function of enhancing the resonance degree of the reception side resonance circuit by controlling the capacitance value of the resonance capacitor 42. Specifically, the control system 200 includes a resonance circuit 210, a voltage and current detector 220, a reference voltage generation circuit 230, a switch control circuit 240, and a switching circuit 250. Although the case in which the control voltages Vg1 and Vg2 are generated using the above method A will be described below as an example, this structure is also applicable when the control voltages are generated using the above method B.

The resonance circuit 210 corresponds to the reception side resonance circuit and includes the power reception coil 41 and the resonance capacitor 42 illustrated in FIG. 1. The voltage and current detector 220 detects a voltage Vr that depends on the voltage applied to the resonance circuit 210 and a current Ir that depends on the current flowing through the resonance circuit 210. It should be noted here that the voltage and current detector 220 may include one detector or include detectors for detecting the voltage and the current.

Specifically, for example, the combined voltage (that is, the voltage obtained by subtracting the induced voltage of the power reception coil 41 from the voltage applied to both ends of the power reception unit 40) of the power reception coil 41 and the resonance capacitor 42 may be the voltage Vr and the current flowing through the power reception unit 40 may be the current Ir. Among these, the voltage (not including the induced voltage) applied to both ends of the power reception coil 41 can be derived based on the impedance characteristics (measured in advance) of the power reception coil 41 and the current (that is, the current flowing through the power reception unit 40) flowing through the power reception coil 41. Accordingly, the voltage and current detector 220 only needs to detect the voltage applied to both ends of the resonance capacitor 42 and the current flowing through the power reception unit 40, which can be used to derive the combined voltage described above.

Alternatively, the voltage and current detector 220 may detect the voltage applied to both ends of the power supply circuit 10 and the current output from the power supply circuit 10 as the voltage Vr and the current Ir in the power transmission device 2 illustrated in FIG. 1. In this case, the voltage value and the current value detected by the voltage and current detector 220 may be transmitted from the power transmission device 2 to the power reception device 3 via a wired or wireless network.

The reference voltage generation circuit 230 controls the duty ratio as an intermediate variable based on the phase difference AO between the voltage Vr and the current Ir detected by the voltage and current detector 220 and generates the reference voltage Vref according to the duty ratio. Generally, the resonance degree of the resonance circuit is stronger as the phase difference between the voltage and the current of the resonance circuit is smaller. Accordingly, the reference voltage generation circuit 230 controls the duty ratio so as to reduce (for example, minimize) the phase difference AO between the voltage Vr and the current Ir.

The switch control circuit 240 corresponds to the switch control circuit 110 illustrated in FIG. 2. That is, the switch control circuit 240 generates the control voltages Vg1 and Vg2 by comparing the reference voltage Vref supplied from the reference voltage generation circuit 230 with the voltage V2 and the voltage −V2 supplied from the resonance circuit 210, respectively.

The switching circuit 250 corresponds to the transistors Tr1 and Tr2 illustrated in FIG. 2. That is, in the switching circuit 250, the transistors Tr1 and Tr2 are switched on and off repeatedly according to the control voltages Vg1 and Vg2 supplied from the switch control circuit 240. This continuously regulates the capacitance value of the resonance capacitor 42 according to a duty ratio D calculated by the reference voltage generation circuit 230.

As described above, in the non-contact power feeding system 1, the resonance frequency of the reception side resonance circuit can be continuously regulated by controlling the capacitance value of the resonance capacitor 42 according to the frequency of a signal received by the power reception device 3. Accordingly, even when a deviation occurs between the frequency of the transmission signal transmitted from the power transmission device 2 and the resonance frequency of the reception side resonance circuit, the deviation between these frequencies can be compensated accurately, thereby improving the transmission efficiency of electric power. In addition, upsizing of the circuit can be suppressed since the capacitance value can be regulated in a circuit structure smaller than a structure using, for example, a mechanical variable capacitor.

Figure 8:
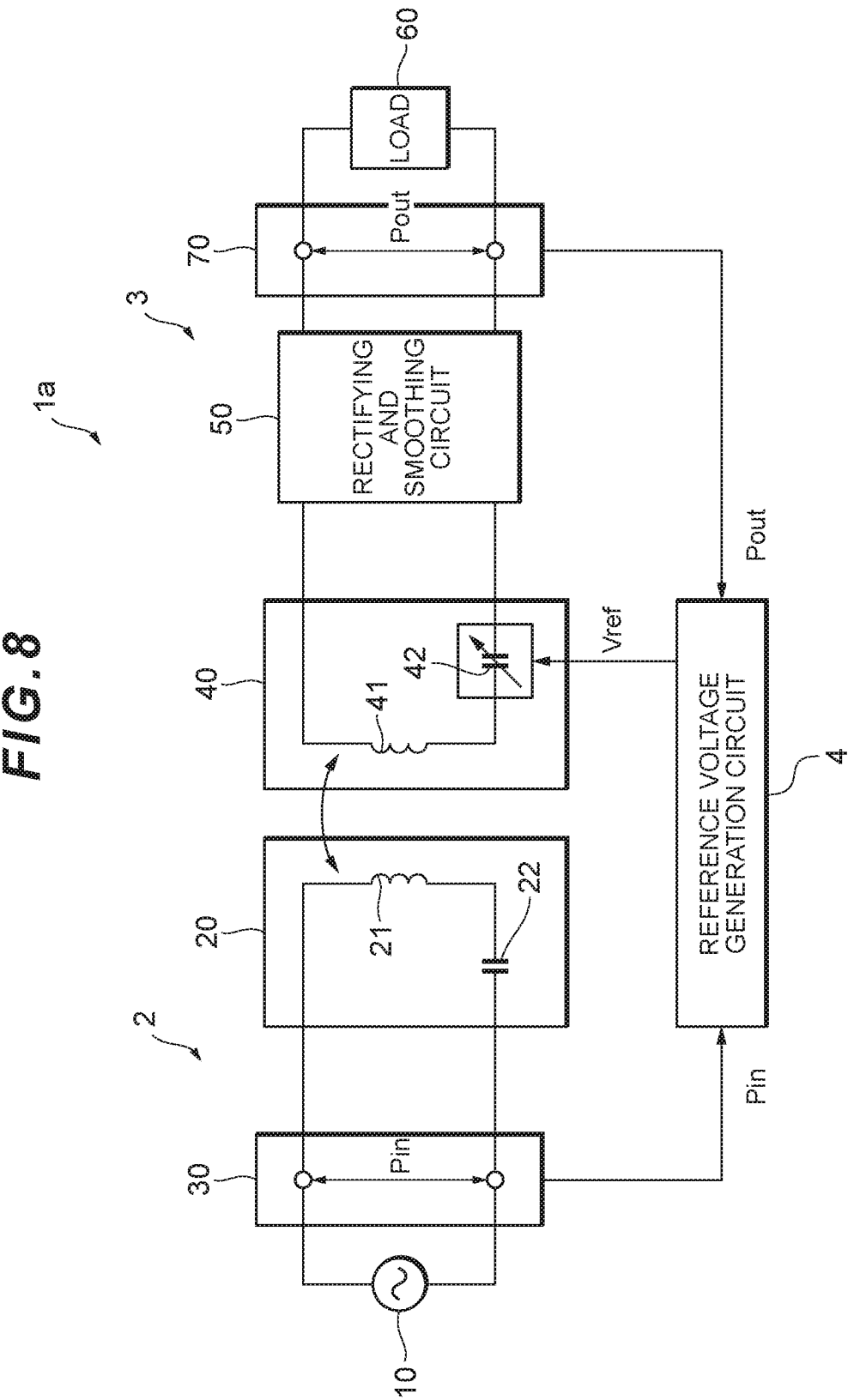
FIG. 8 is a diagram illustrating the entire structure of a non-contact power feeding system according to a second embodiment of the present invention.

FIG. 8 is a diagram illustrating the entire structure of a non-contact power feeding system according to a second embodiment of the present invention. A non-contact power feeding system 1a illustrated in FIG. 8 further includes a first detector 30, a second detector 70, and a reference voltage generation circuit 4 as compared with the non-contact power feeding system 1 illustrated in FIG. 1.

The first detector 30 is provided between the power supply circuit 10 and the power transmission unit 20 in the power transmission device 2 and detects electric power Pin (first electric power) supplied from the power supply circuit 10 to the power transmission unit 20. It should be noted here that the first detector 30 may be included in the power transmission device 2 or may be provided outside the power transmission device 2.

The second detector 70 is provided between the rectifying and smoothing circuit 50 and the load 60 in the power reception device 3 and detects electric power Pout (second electric power) that depends on the electric power received by the power reception device 3. It should be noted here that the second detector 70 may be included in the power reception device 3 or may be provided outside the power reception device 3.

The reference voltage generation circuit 4 generates the reference voltage Vref for controlling the capacitance value of the resonance capacitor 42 based on the electric power Pin detected by the first detector 30 and the electric power Pout detected by the second detector 70. Specifically, the reference voltage generation circuit 4 controls the duty ratio described above so as to increase the ratio of the electric power Pout (Pout/Pin) to the electric power Pin based on, for example, the ratio between the electric power Pin and the electric power Pout and generates the reference voltage Vref based on the duty ratio. This increases the received electric power with respect to the transmitted signal and improves the transmission efficiency of the non-contact power feeding system 1a. Alternatively, the reference voltage generation circuit 4 may control the duty ratio described above based on the electric power Pout so that the electric power Pout is equal to or more than a predetermined level. This also increases the received electric power and improves the transmission efficiency of the non-contact power feeding system 1a. It should be noted here that connection between the first detector 30 and the reference voltage generation circuit 4 and connection between the second detector 70 and the reference voltage generation circuit 4 may be made via, for example, wired or wireless networks so as to enable mutual communication.

Figure 9:
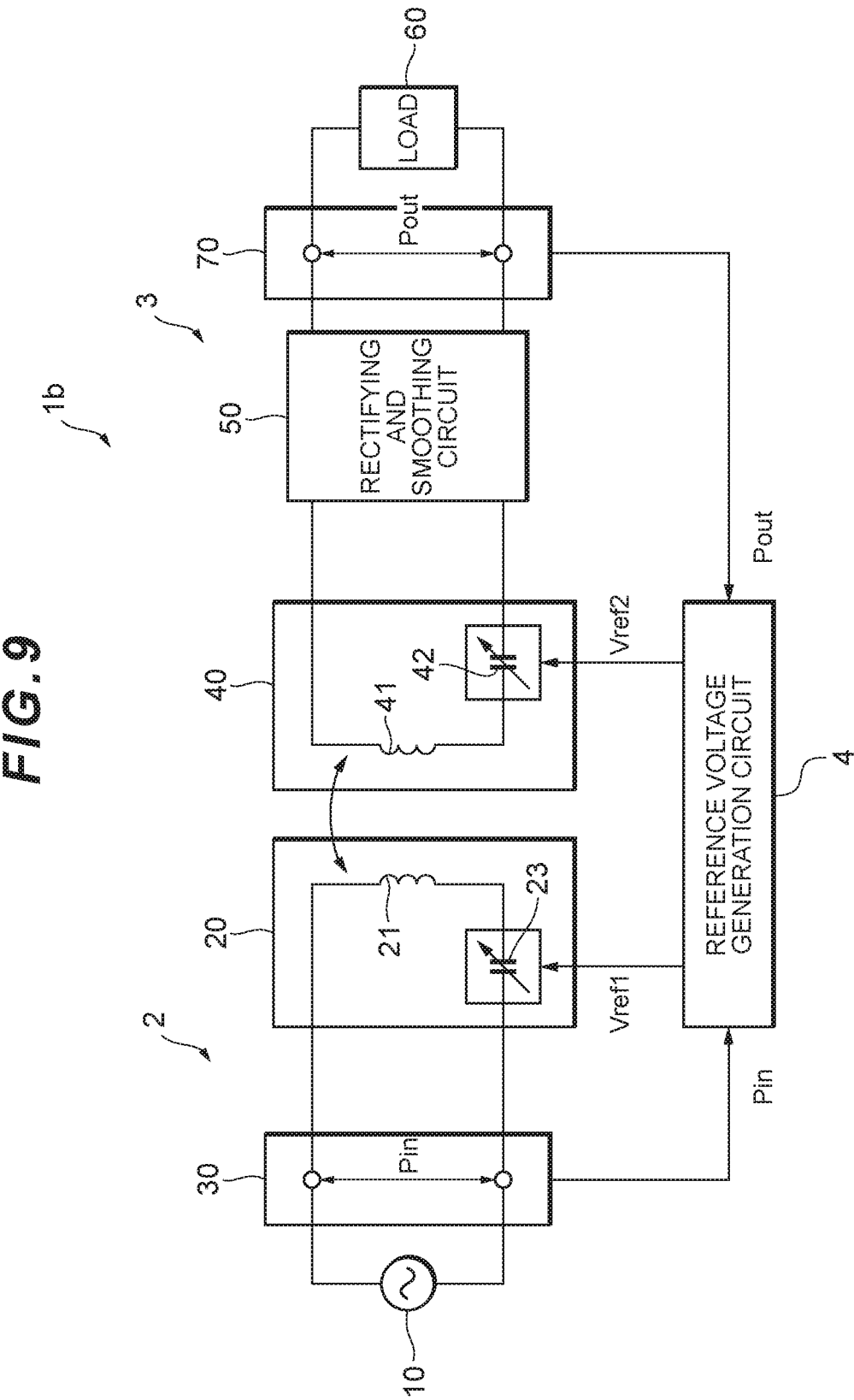
FIG. 9 is a diagram illustrating the entire structure of a non-contact power feeding system according to a third embodiment of the present invention.

FIG. 9 is a diagram illustrating the entire structure of a non-contact power feeding system according to a third embodiment of the present invention. In a non-contact power feeding system 1b illustrated in FIG. 9, a resonance capacitor 23 included in the power transmission unit 20 is configured by the variable capacitance circuit as the resonance capacitor 42 included in the power reception unit 40.

In the non-contact power feeding system 1b, the resonance frequency of the resonance circuit (also referred to below as "the transmission side resonance circuit") included in the power transmission unit 20 can also be regulated in addition to the resonance frequency of the reception side resonance circuit. Specifically, in the non-contact power feeding system 1b, the reference voltage generation circuit 4 generates and outputs a reference voltage Vref1 for controlling the capacitance value of the resonance capacitor 23 and a reference voltage Vref2 for controlling the capacitance value of the resonance capacitor 42. The capacitance value of the resonance capacitor 23 is controlled so that, for example, the resonance frequency of the transmission side resonance circuit is equal to the frequency of the AC power supply voltage output by the power supply circuit 10. This increases the transmission electric power with respect to the AC power supply voltage. It should be noted here that the structure of the resonance capacitor 23 will not be described in detail since the variable capacitance circuits 100 and 100A to 100C are applicable.

Although the control method (that is, the control method of the reference voltage Vref1) of the capacitance value of the resonance capacitor 23 is not particularly limited, whether appropriate electric power is transmitted from the power transmission device 2 may be determined by, for example, detecting the electric power received by the power reception device 3 while electric power is transmitted from the power transmission device 2 to the power reception device 3. In this case, the reference voltage generation circuit 4 may control the duty ratio described above so that the electric power Pout is equal to or more than a predetermined level based on, for example, the electric power Pout detected by the second detector 70 and generate the reference voltage Vref1 according to the duty ratio.

In the structure described above, when, for example, the frequency of an AC power supply voltage generated by the power supply circuit 10 is variable, the non-contact power feeding system 1b can regulate the resonance frequency of the resonance circuit according to this frequency. Accordingly, the non-contact power feeding system 1b can achieve increase in transmission electric power in addition to improvement of the transmission efficiency of electric power.

It should be noted here that, in the non-contact power feeding system 1b, the resonance capacitor 42 may be configured by a capacitor having a fixed capacitance value. In addition, the above control methods of the capacitance value of the variable capacitance circuit may be combined with each other.

Next, a specific method of generating the reference voltage Vref according to the duty ratio will be described. As described above, the duty ratio is determined by the ratio of the reference voltage Vref to the amplitude value of the voltage V2 applied to both ends of the capacitor C2. The amplitude value of the voltage V2 may fluctuate according to, for example, the magnitude of electric power transmitted from the power transmission device 2, the capacitance value of the capacitor C1, and the like. In consideration of this, the method of generating the reference voltage Vref that can make the duty ratio constant even when the amplitude value of the voltage V2 fluctuates will be described below.

Figure 10:
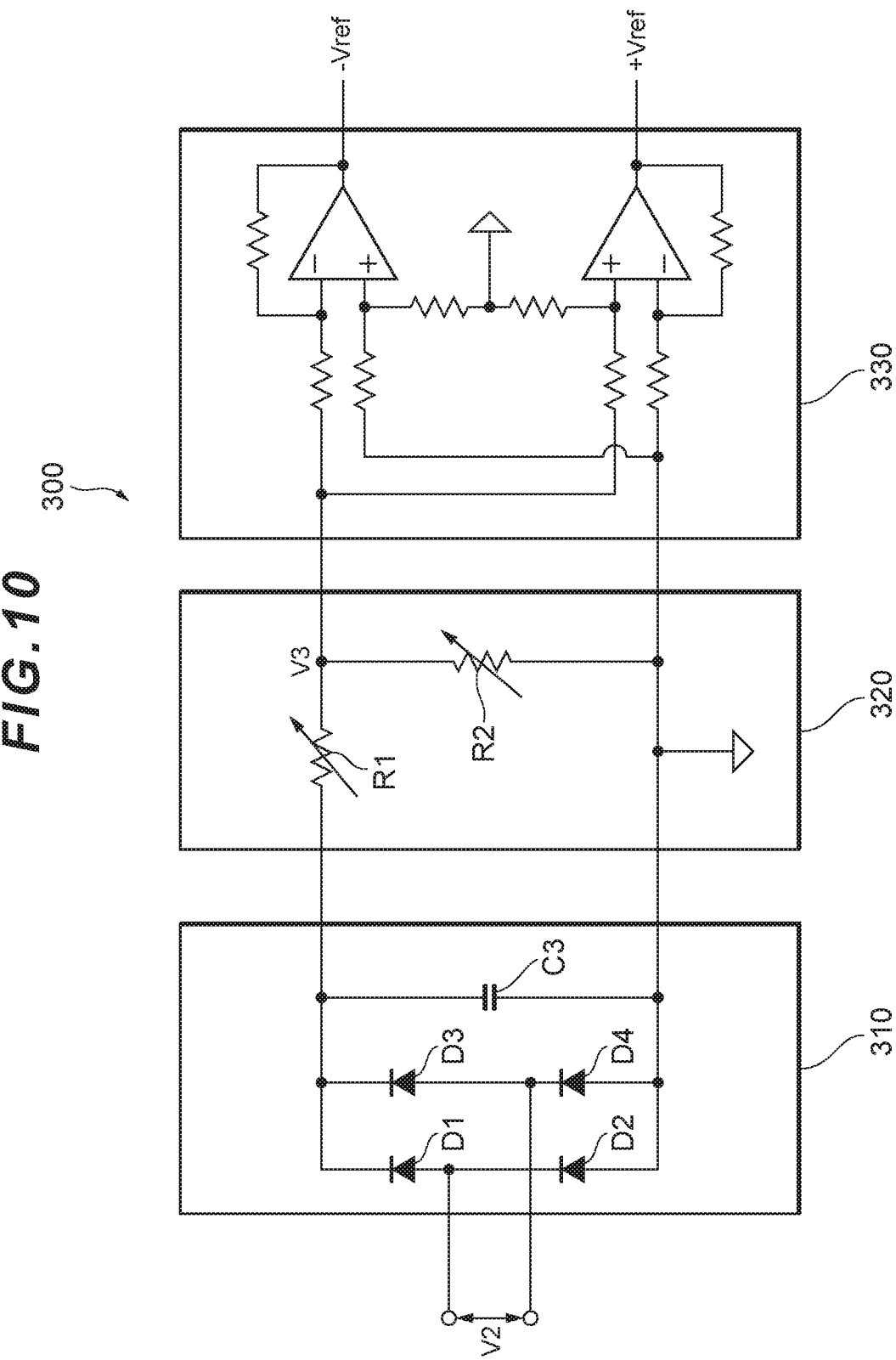
FIG. 10 is a diagram illustrating the circuit structure of a reference voltage regulator circuit that regulates a reference voltage so as to keep a specified duty ratio in the non-contact power feeding system according to the first embodiment of the present invention.

FIG. 10 is a diagram illustrating the circuit structure of a reference voltage regulator circuit that regulates the reference voltage so as to keep a specified duty ratio in the non-contact power feeding system according to the first embodiment of the present invention. Although an example in which the reference voltage Vref and the reversed reference voltage −Vref are generated using the above method B will be described below, this structure is also applicable when the reference voltage Vref is generated using the above method A.

A reference voltage regulator circuit 300 is included in, for example, the reference voltage generation circuit 230 illustrated in FIG. 7 and the reference voltage generation circuit 4 illustrated in FIGS. 8 and 9. The reference voltage regulator circuit 300 generates the reference voltage so as to achieve the duty ratio calculated by the reference voltage generation circuits 230 and 4. Specifically, the reference voltage regulator circuit 300 includes a rectifying circuit 310, a voltage dividing circuit 320, and a differential amplification circuit 330.

The rectifying circuit 310 includes a pair of diodes D1 and D2 connected in series to each other, a pair of diodes D3 and D4 connected in series to each other, and a capacitor C3 connected in parallel to the pair of diodes D1 and D2 and the pair of diodes D3 and D4. The rectifying circuit 310 rectifies the voltage V2, which is an AC voltage, to a DC voltage and outputs the DC voltage.

The voltage dividing circuit 320 includes a variable resistor element R1 and a variable resistor element R2 connected in series to each other. The voltage dividing circuit 320 divides the voltage rectified by the rectifying circuit 310 at a predetermined ratio and outputs a divided voltage V3 from the connection point between the variable resistor element R1 and the variable resistor element R2. It should be noted here that the divided voltage V3 is represented by V3=r2/(r1+r2)×V2 where the resistor value of the variable resistor element R1 is r1 and the resistor value of the variable resistor element R2 is r2. In the voltage dividing circuit 320, the ratio of the reference voltage Vref to the amplitude value of the voltage V2 can be regulated by appropriately designing the resistor values of the variable resistor elements R1 and R2. Accordingly, the duty ratio described above can be kept at a specified level.

The differential amplification circuit 330 differentially amplifies the voltage V3 divided by the voltage dividing circuit 320 and the ground potential and outputs the reference voltage Vref and the reversed reference voltage −Vref. Since a general differential amplification circuit can be used as the differential amplification circuit 330, detailed description is omitted.

In the structure described above, the reference voltage regulator circuit 300 generates the reference voltage Vref that is proportional to the amplitude value of the voltage V2 applied to both ends of the capacitor C2 and the reversed reference voltage −Vref. Even when this causes the amplitude value of the voltage V2 to fluctuate due to, for example, differences of the magnitude of electric power transmitted from the power transmission device 2, fluctuations of the capacitance value of the capacitor C1, transient characteristics of circuits, and the like, the reference voltage Vref and the reversed reference voltage −Vref also fluctuate according to the amplitude value of the voltage V2. Accordingly, the duty ratio can be kept constant without use of complicated circuits as compared with the structure that specifies the reference voltage again according to, for example, fluctuations of the amplitude value of the voltage V2.

It should be noted here that the voltage V2 applied to both ends of the capacitor C2 may be detected by, for example, a differential amplification circuit and the voltage output from the differential amplification circuit may be supplied to the reference voltage regulator circuit 300.

[Example of Application]

The non-contact power feeding systems 1, 1a, and 1b can be used to feed electric power to, for example, an automatic guided vehicle (AGV) that automatically runs in a factory, an electric vehicle, or the like. In the non-contact power feeding systems 1, 1a, and 1b, when, for example, one power reception device receives electric power from a plurality of power transmission devices, even if the frequencies of transmission signals transmitted from the power transmission devices are different from each other, by regulating the resonance frequency of the power reception unit 40 according to the frequencies of the transmission signals, the power reception device can receive the electric power with high transmission efficiency.

Alternatively, the non-contact power feeding systems 1, 1a, and 1b can be used to feed electric power to a wearable device such as a seal type pulse sensor or textile side myoelectric sensor. The entire circuit needs to be flexible to build the power reception device 3 into such a flexible device. When the power reception coil 41 is flexible, the inductance value fluctuates due to deformation of the power reception coil 41, possibly causing fluctuations of the resonance frequency of the power reception unit 40. To address this problem, in the non-contact power feeding systems 1, 1a, and 1b, the resonance frequency of the power reception unit 40 can coincide with the frequency of the transmission signal by regulating the capacitance value of the resonance capacitor 42 so as to compensate fluctuations of the inductance value of the power reception coil 41. Accordingly, electric power can be received with transmission efficiency.

[Modification]

The embodiments described above are adopted to make understanding of the present invention easy and do not limit the interpretation of the present invention. The components of the embodiments, and the dispositions, materials, conditions, shapes, and sizes thereof are not limited to those illustrated and changes can be made as appropriate. In addition, partial replacement or combination between components of different embodiments can be performed.

For example, although aspects for forming both the power transmission unit 20 and the power reception unit 40 as series resonance circuits are adopted in the above embodiments, the present invention is not limited to the examples and one or both of the power transmission unit 20 and the power reception unit 40 may be configured by parallel resonance circuits. In this case, the resonance frequency of the resonance circuit can also be regulated by applying the variable capacitance circuit described above to the resonance capacitor.

In addition, in the embodiments described above, an impedance rectifying circuit may be further provided, for example, between the power supply circuit 10 and the power transmission unit 20 in the power transmission device 2 or between the power reception unit 40 and the load 60 in the power reception device 3. By applying the variable capacitance circuit described above to a capacitor included in this impedance rectifying circuit, the capacitance value can be regulated according to the frequency of a signal, thereby enabling improvement of the transmission electric power and the transmission efficiency.

REFERENCE SIGNS LIST

1 Non-contact power feeding system
2 Power transmission device
3 Power reception device
4 Reference voltage generation circuit
10 Power supply circuit
20 Power transmission unit
30 First detector
40 Power reception unit
50 Rectifying and smoothing circuit
60 Load
70 Second detector
21 Power transmission coil
22, 23 Resonance capacitor
41 Power reception coil
42 Resonance capacitor
100, 100A to 100C Variable capacitance circuit
110, 110A, 110B Switch control circuit
111 AND circuit
200 Control system
210 Resonance circuit
220 Voltage and current detector
230 Reference voltage generation circuit
240 Switch control circuit
250 Switching circuit
300 Reference voltage regulator circuit
310 Rectifying circuit
320 Voltage dividing circuit
330 Differential amplification circuit
C1 to C3 Capacitor
Tr1 to Tr4 Transistor
OP1 to OP4 Comparator
D1 to D4 Diode
R1, R2 Variable resistor element

What is claimed is:

1. A power reception device comprising:
    a variable capacitance circuit; and
    a power reception coil that constitutes a resonance circuit together with the variable capacitance circuit, wherein
    the variable capacitance circuit includes a first capacitor and a second capacitor connected in parallel to each other,
    a first switch connected in series to one end side of the first capacitor,
    a switch control circuit that controls turning on and off of the first switch and includes a first comparator that supplies a first control voltage to the first switch according to a comparison result between a reference voltage and an AC voltage applied to the second capacitor,
    a voltage and current detector that detects a voltage applied to the resonance circuit and a current flowing through the resonance circuit,
    a reference voltage generation circuit that generates the reference voltage so as to reduce a phase difference between the voltage and the current detected by the voltage and current detector, and
    wherein the reference voltage generation circuit further includes a reference voltage regulator circuit that regulates the reference voltage according to a fluctuation of an amplitude value of the AC voltage.

2. The power reception device according to claim 1, wherein
    the variable capacitance circuit further includes a second switch connected in series to the other end side of the first capacitor, and
    the switch control circuit further includes a second comparator that supplies a second control voltage to the second switch according to a comparison result between the reference voltage and an opposite phase voltage having a phase opposite to a phase of the AC voltage and controls turning on and off of the second switch.

3. The power reception device according to claim 1, wherein
    the variable capacitance circuit further includes a second switch connected in series to the other end side of the first capacitor, and
    the switch control circuit further includes a second comparator that supplies a second control voltage to the second switch according to a comparison result between a reversed reference voltage obtained by reversing a sign of the reference voltage and the AC voltage and controls turning on and off of the second switch.

4. The power reception device according to claim 2, wherein
    the variable capacitance circuit further includes:
    a third switch connected in series to the first switch on the one end side of the first capacitor and
    a fourth switch connected in series to the second switch on the other end side of the first capacitor,
    the first comparator supplies the first control voltage to the fourth switch,
    the second comparator supplies the second control voltage to the third switch, and
    the third switch is connected to the first switch and the fourth switch is connected to the second switch so that parasitic diodes thereof are oriented oppositely to each other.

5. The power reception device according to claim 2, wherein
    the switch control circuit further includes an AND circuit that receives the first control voltage and the second control voltage and outputs a third control voltage, and
    the AND circuit supplies the third control voltage to the first switch and the second switch in place of the first control voltage and the second control voltage.

6. The power reception device according to claim 1, further comprising:
    a detector that detects electric power received by the power reception device and a reference voltage generation circuit that generates the reference voltage so that the electric power detected by the detector is equal to or more than a predetermined level.

7. The power reception device according to claim 1, wherein
the reference voltage regulator circuit includes a rectifying circuit that rectifies the AC voltage, a voltage dividing circuit that divides the rectified voltage, and a differential amplification circuit that differentially amplifies the divided voltage.

8. A wearable device comprising:
the power reception device according to claim 1.

9. A non-contact power feeding system comprising:
the power reception device according to claim 1;
a power transmission device that includes a power supply circuit and a power transmission unit and transmits electric power to the power reception device;
a first detector that detects first electric power to be supplied from the power supply circuit to the power transmission unit;
a second detector that detects second electric power received by the power reception device; and
a reference voltage generation circuit that generates the reference voltage so as to increase
the second electric power relative to the first electric power.

10. The power reception device according to claim 3, wherein
the variable capacitance circuit further includes
a third switch connected in series to the first switch on the one end side of the first capacitor and
a fourth switch connected in series to the second switch on the other end side of the first capacitor,
the first comparator supplies the first control voltage to the fourth switch,
the second comparator supplies the second control voltage to the third switch, and
the third switch is connected to the first switch and the fourth switch is connected to the second switch so that parasitic diodes thereof are oriented oppositely to each other.

11. The power reception device according to claim 3, wherein
the switch control circuit further includes an AND circuit that receives the first control voltage and the second control voltage and outputs a third control voltage, and
the AND circuit supplies the third control voltage to the first switch and the second switch in place of the first control voltage and the second control voltage.

12. The power reception device according to claim 2, further comprising:
a voltage and current detector that detects a voltage applied to the resonance circuit and a current flowing through the resonance circuit; and
a reference voltage generation circuit that generates the reference voltage so as to reduce a phase difference between the voltage and the current detected by the voltage and current detector.

13. The power reception device according to claim 3, further comprising:
a voltage and current detector that detects a voltage applied to the resonance circuit and a current flowing through the resonance circuit; and
a reference voltage generation circuit that generates the reference voltage so as to reduce a phase difference between the voltage and the current detected by the voltage and current detector.

14. The power reception device according to claim 4, further comprising:
a voltage and current detector that detects a voltage applied to the resonance circuit and a current flowing through the resonance circuit; and
a reference voltage generation circuit that generates the reference voltage so as to reduce a phase difference between the voltage and the current detected by the voltage and current detector.

15. The power reception device according to claim 5, further comprising:
a voltage and current detector that detects a voltage applied to the resonance circuit and a current flowing through the resonance circuit; and
a reference voltage generation circuit that generates the reference voltage so as to reduce a phase difference between the voltage and the current detected by the voltage and current detector.

16. The power reception device according to claim 6, wherein
the reference voltage generation circuit further includes a reference voltage regulator circuit that regulates the reference voltage according to a fluctuation of an amplitude value of the AC voltage.

\* \* \* \* \*